United States Patent [19]

Stolzenberg et al.

[11] Patent Number: 5,060,957
[45] Date of Patent: Oct. 29, 1991

[54] POWER-OPERATED CHUCK

[75] Inventors: Hans Stolzenberg, Korschenbroich; Karl-Heinz Schmitz, Meerbusch, both of Fed. Rep. of Germany

[73] Assignee: Paul Forkardt GmbH & Co. KG, Düsseldorf, Fed. Rep. of Germany

[21] Appl. No.: 375,394

[22] Filed: Jul. 3, 1989

[30] Foreign Application Priority Data

Jul. 4, 1988 [DE] Fed. Rep. of Germany ....... 3822506

[51] Int. Cl.$^5$ .............................................. B23B 31/16
[52] U.S. Cl. ................................... 279/1 C; 279/121
[58] Field of Search ............... 279/1 C, 121, 1 J, 110, 279/122

[56] References Cited

U.S. PATENT DOCUMENTS

| 1,786,147 | 12/1930 | Bullard | 279/121 |
| 4,047,723 | 9/1977 | Buch | 279/1 C X |
| 4,240,645 | 12/1980 | Rohm | 279/1 C |
| 4,696,209 | 9/1987 | Felten et al. | 279/1 C X |

FOREIGN PATENT DOCUMENTS

| 7613635 | 9/1976 | Fed. Rep. of Germany . | |
| 2605299 | 7/1977 | Fed. Rep. of Germany . | |
| 3220585 | 12/1983 | Fed. Rep. of Germany | 279/121 |
| 2248901 | 5/1975 | France | 279/1 C |
| 2025808 | 1/1980 | United Kingdom . | |

*Primary Examiner*—Larry I. Schwartz
*Assistant Examiner*—Robert Schultz
*Attorney, Agent, or Firm*—Robert W. Becker & Associates

[57] ABSTRACT

A power-operated chuck having a chuck body and clamping jaws that are displaceably guided in radial guides of the chuck body and that are adapted to be actuated by at least one drive element, which is displaceably guided in the chuck body and is actuated by a force producer that is operated with pressure medium. At least one chamber for receiving lubricating grease is provided in the chuck body, with lubricating bores establishing communication between the chamber and at least some glide surfaces provided for the chuck. At least one chuck component is provided that is moved during actuation of the clamping jaws, with this at least one chuck component extending into the chamber for the production of a pump movement that presses lubricating grease into the lubricating bores.

7 Claims, 1 Drawing Sheet

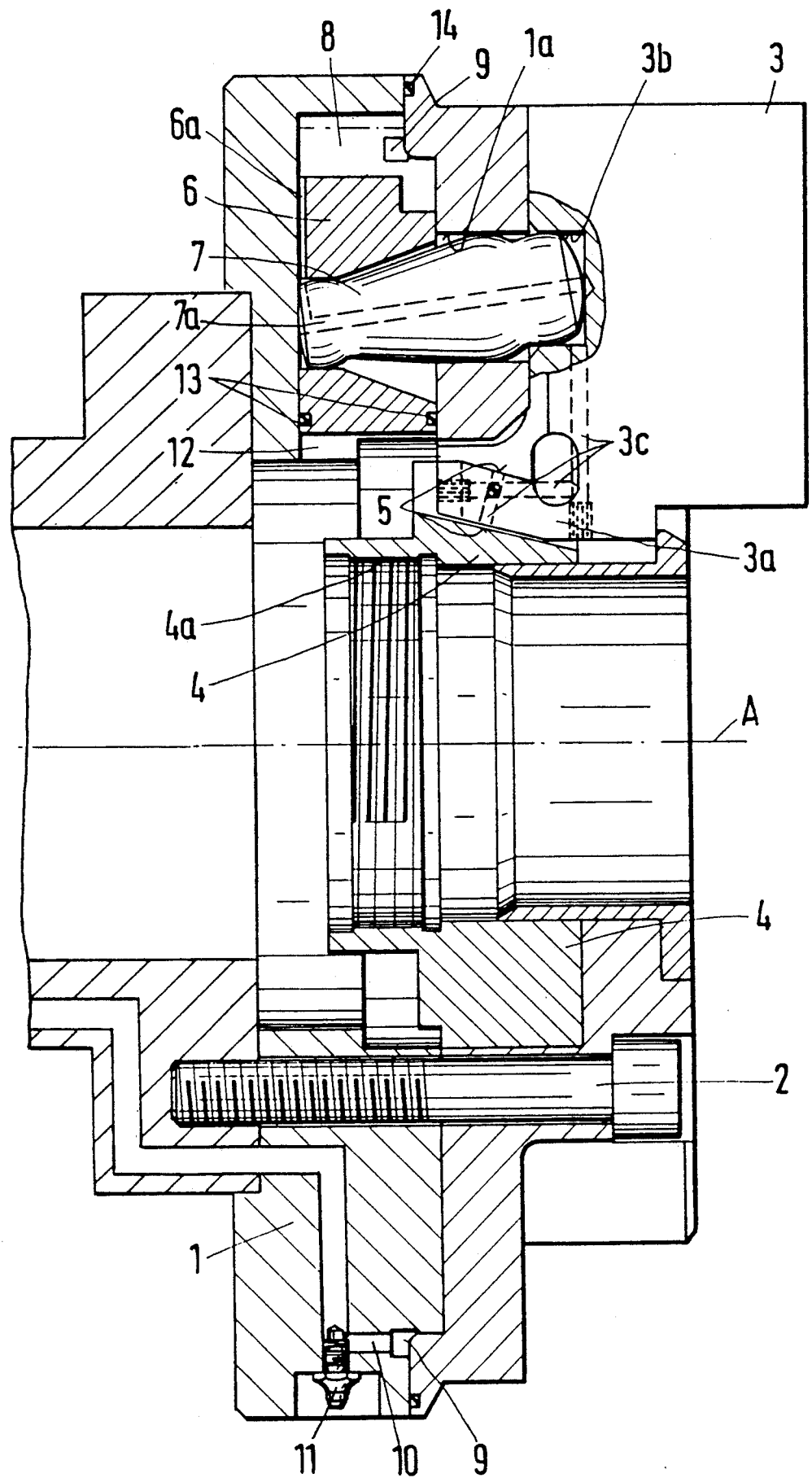

POWER-OPERATED CHUCK

BACKGROUND OF THE INVENTION

1. Field of the Invention

The present invention relates to a power-operated chuck having a chuck body and gripping or clamping jaws that are displaceably guided in radial guide means of the chuck body and that are adapted to be actuated by at least one drive element, which is displaceably guided in the chuck body and is actuated by a force producer that is operated with pressure medium.

2. Description of the Prior Art

A number of embodiments of power-operated chucks of this general type are known. The clamping forces that can be achieved with these chucks, and in particular the precision with which the magnitude of the clamping force that is produced by the force producer that is operated with pressure medium can be repeated, depend greatly upon the respective state of lubrication of the drive elements that are provided between the force producer and the clamping jaws that are displaceably guided in radial guide means of the chuck body.

It is an object of the present invention, for power-operated chucks of the aforementioned general type, to provide a forced lubrication that assures a continuous and uniform state of lubrication of the drive elements.

BRIEF DESCRIPTION OF THE DRAWING

This object, and other objects and advantages of the present invention, will appear more clearly from the following specification in conjunction with the accompanying schematic drawing, which is a cross-sectional view through one exemplary embodiment of the inventive chuck, with this view being illustrated through a centrifugal force compensation chuck that has a key drive.

SUMMARY OF THE INVENTION

The power-operated chuck of the present invention is characterized primarily in that at least one hollow space or chamber for receiving lubricating grease is provided in the chuck body, with lubricating bores establishing communication between the chamber and at least some glide surfaces that are provided for the chuck; at least one chuck component is provided that is moved during actuation of the clamping jaws, with this at least one chuck component extending into the chamber for the production of a pump movement that presses lubricating grease into the lubricating bores.

As a result of the inventive chuck construction, with each clamping movement of the clamping jaws a certain amount of lubricating grease is supplied via the lubricating bores to the glide surfaces of the chuck via the chuck component that extends into the chamber that is filled with lubricating grease, so that a prescribed state of lubrication is maintained at these glide surfaces. In this way, to the extent that the chamber or chambers formed in the chuck body are always filled with an adequate amount of lubricating grease, the prescribed state of lubrication is assured over a long period of time without the necessity for an operator to have to regularly and in short time intervals supply the chuck with lubricating grease via grease fittings. Thus, at little structural expense and without requiring additional space for the chuck, the inventive construction provides for the achievement of high clamping forces, i.e. for the maintenance of prescribed clamping forces during a number of successive clamping processes.

If the power-operated chuck with its chuck body is disposed on a rotatably driven spindle or arbor, it is proposed pursuant to a further feature of the present invention to provide the hollow space or chamber in the chuck body at a location thereof that is disposed as far radially outwardly as possible, and to provide the radially inwardly disposed end of the chuck body with passage means for the excess lubricating grease that escapes from the glide surfaces. As a result of this inventive embodiment, the excess lubricating grease that escapes from the glide surfaces in the interior of the chuck travels back into the chamber under the influence of the centrifugal force. To enable this return movement, in general no additional passage means or bores are required, since the joints present with the known chucks allow the lubricating grease that is under the influence of the centrifugal force to pass through, yet on the other hand prevent the passage of lubricating grease merely under the influence of the force of gravity.

The chamber or chambers provided for accommodating lubricating grease are, in one preferred specific embodiment of the present invention, connected via a supply channel either to a grease fitting or to a central lubricating grease supply of the machine tool. Accordingly, a manual refilling of lubricating grease, or a refilling via a central lubricating grease supply, is necessary only at greater intervals.

If the chuck is a so-called centrifugal force compensation chuck having centrifugal force counter-weights that are each connected to the pertaining clamping jaw via a lever that is supported in the chuck body, it is proposed pursuant to a further feature of the present invention that each space that accommodates a counter-weight be embodied as a chamber that can be filled with lubricating grease. This eliminates the need for providing additional chambers; in addition, the movement of the counter-weights can be utilized, without structural alteration, to generate the pump movement that presses the lubricating grease into the lubricating bores.

Pursuant to one preferred specific embodiment of such a centrifugal force compensation chuck pursuant to the present invention, the hollow space or chamber communicates via a groove that extends radially in the counter-weight with one end of a bore that is formed in the lever, with the other end of this bore being connected via lubricating bores provided in the clamping jaw with those glide surfaces disposed between the clamping jaw and the drive element. Thus, it is necessary to merely have a few additional bores in order to guide the lubricating grease present in the receiving chamber for a respective counter-weight to the glide surfaces between the clamping jaw and the drive element. It is to be understood that it is also possible to provide lubricating bores that lead to the radial guide surfaces of the chuck body for the clamping jaws in order to also connect these glide surfaces to the inventive forcible lubrication arrangement.

Further specific features of the present invention will be described in detail subsequently.

DESCRIPTION OF PREFERRED EMBODIMENTS

Referring now to the drawing in detail, shown is a chuck body 1 that is secured via bolts or screws 2 to a non-illustrated flange of a rotatably driven machine tool spindle or arbor. In the illustrated embodiment, three gripping or clamping jaws 3 are displaceably guided in radial guide means of the chuck body 1; as a consequence of the sectional plane of the drawing, only one of these three clamping jaws 3 can be seen. Each of the clamping jaws 3 is connected via a key means 3a with a chuck piston 4 that receives the key means 3a in appropriate recess means. The chuck piston 4 is axially displaceably guided in the chuck body 1 and is provided with an internal thread 4a via which the piston 4 is connected with a non-illustrated actuating rod that, in turn, is connected with the similarly not illustrated force producer, for example with the piston of a cylinder that is operated with pressure medium and is disposed at the other end of the machine tool arbor.

Since the chuck piston 4 is connected with the key means 3a of the clamping jaws 3 via glide surfaces 5 that extend at an acute angle to the axis of rotation A of the chuck, an axial displacement of the chuck piston 4 results in a radial displacement movement of the clamping jaws 3.

In the illustrated embodiment, counter-weights 6 are provided in order to eliminate or at least considerably reduce the centrifugal forces that act upon the clamping jaws 3 during high chuck speeds. Such a counter-weight 6 is associated with each clamping jaw 3, with the counter-weight 6 being centrally disposed behind the clamping jaw 3 in the chuck body 1, and being connected with the clamping jaw 3 via a lever 7 that is supported in a bore 1a of the chuck body 1. As can be seen from the drawing, the front end of the lever 7 extends into a hole 3b of the clamping jaw 3, whereas the rear end of the lever 7 is movably disposed in the counter-weight 6. In this way, the centrifugal force that acts in a radially outward manner upon the clamping jaw 3 is compensated for by a corresponding force that duo to the centrifugal force that acts upon the counter-weight 6, loads or stresses the lever 7 so that this lever stresses the clamping jaw 3 in a centripetal direction. In this way, at least a major portion of the centrifugal force that acts upon the clamping jaw 3 can be compensated for.

In the illustrated embodiment, the hollow spaces or chambers 8 that are provided in the chuck body 1 for the counter-weights 6 are interconnected by an annular channel 9 that is provided in the chuck body 1. Connected to this annular channel 9 via a supply channel 10 is a grease fitting 11, so that the chambers 8 can be supplied with suitable lubricating grease.

In order to be able to guide this lubricating grease from the chambers 8, and in particular to the glide surfaces 5 between the chuck piston 4 and the clamping jaws 3, each counter-weight 6 is provided with a radially extending groove 6a that communicates with one end of a bore 7a that is provided in the lever 7, with the other end of the bore 7a opening out into the hole 3b of the clamping jaw 3. Proceeding from this hole 3b are a number of lubricating bores 3c that are provided in the clamping jaw 3 and that lead to all of the glide surfaces 5 between the clamping jaw 3 and the chuck piston 4. It is to be understood that it is also possible to provide additional lubricating bores, not shown in the drawing, that lead to those glide surfaces between the clamping jaw 3 and the chuck body 1 that extend radially in the chuck body.

Prior to starting up the chuck, the chambers 8 are filled with lubricating grease via the grease fitting 11, the supply channel 10, and the annular channel 9. When the chuck is subsequently used for clamping-in a workpiece, for example for an external clamping, and in this connection the counter-weights 6 are moved radially outwardly, the size of the chambers 8 is reduced by the counter-weights 6. In so doing, the lubricating grease that is located in the chamber 8 is pressed radially inwardly through the groove 6a to the rear end of the lever 7, where it enters the central bore 7a of the lever. The lubricating grease passes through the bore 7a into the hole 3b of the clamping jaw 3, and from there passes via the lubricating bores 3c to the glide surfaces 5. This lubricating process is forcibly repeated with every clamping movement of the jaws 3, so that the glide surfaces 5 between the clamping jaws 3 and the chuck piston 4 are forcibly lubricated and are kept in a continuous state of lubrication over a long period of time.

The excess lubricating grease that escapes from the glide surfaces 5 is guided radially outwardly under the influence of centrifugal force. This grease preferably collects in the space or chamber 12, which surrounds the attachment end of the chuck piston 4. The chamber 12 is disposed behind the glide surfaces 5 and below or radially inwardly of the counter-weights 6. Due to the centrifugal force, the excess lubricating grease passes from this chamber 12 back into the chamber 8, since the seals 13 that seal the counter-weight 6 relative to the chuck body 1 prevent escape of the lubricating grease under the effect of the force of gravity; however, the sealing effect of the seals 13 is not that great that the seals prevent the lubricating grease from passing through under the influence of centrifugal force. Although the other gaps and joints within the chuck also prevent an undesired escape of lubricating grease under the influence of the force of gravity, they are not so tight that they prevent lubricating grease from passing through under the influence of centrifugal force. This leaves merely the sealing ring 14 that is disposed radially beyond the chambers 8 and seals the two parts of the chuck body 1 relative to one another.

The present invention is, of course, in no way restricted to the specific disclosure of the specification and drawing, but also encompasses any modifications within the scope of the appended claims.

What we claim is:

1. In a power-operated chuck having a chuck body that is disposed on a rotatably driven arbor, and also having clamping jaws that are displaceably guided in radial guide means of said chuck body and are adapted to be actuated by at least one drive element, which is displaceably guided in said chuck body and is actuated by a force producer that is operated with pressure medium, with said chuck body being provided with at least one chamber for receiving lubricating grease and lubricating bores establish communication between said at least one chamber and at least some glide surfaces for said chuck, and with at least one chuck component being associated with said at least one chamber and being moved during actuation of said clamping jaws for producing a pump movement for pressing said lubricating grease into said lubricating bores, the improvement wherein:

said at least one chuck component is one of a plurality of respective centrifugal force counter-weights that are reciprocal in radially extending guides at least one of which being in communication with said at least one chamber; and for each of said clamping jaws, a respective lever is provided that is supported in said chuck body and connects one of said clamping jaws with one of said centrifugal force counter-weights such that during actuation of said clamping jaws, and hence displacement of said centrifugal force counter-weights, said pump movement is produced and said lubricating grease is pressed from said at least one chamber into said lubricating bores and to said glide surfaces.

2. A chuck according to claim 1, in which said at least one chamber is provided in a radially outward location of said chuck body, and with said chuck body having a radially inwardly disposed portion that is provided with passage means for excess lubricating grease that escapes from said glide surfaces due to centrifugal force.

3. A chuck according to claim 1, in which said chuck body is provided with supply channel means leading to said at least one chamber and connected to a grease fitting.

4. A chuck according to claim 1, in which said chuck body is provided with supply channel means leading to said at least one chamber and connected to a central lubricating grease supply of a machine tool.

5. A chuck according to claim 1, in which said lubricating bores include: a bore provided in said lever, a radially extending groove in said counter-weight that connects said at least one chamber with one end of said bore in said lever, and, at the other end of said bore in said lever, bores that are provided in said clamping jaw and lead to said glide surfaces, said guide surfaces being provided between said clamping jaw and said drive element.

6. A chuck according to claim 5, which includes: radial guide surfaces in said chuck body for said clamping jaws, and further lubricating bores that lead to these radial guide surfaces.

7. In a power-operated chuck having a chuck body that is disposed on a rotatably driven arbor, and also having clamping jaws that are displaceably guided in radial guide means of said chuck body and are adapted to be actuated by at least one drive element, which is displaceably guided in said chuck body and is actuated by a force producer that is operated with pressure medium, with said chuck body being provided with at least one chamber for receiving lubricating grease, and lubricating bores establish communication between said at least one chamber and at least some glide surfaces for said chuck, the improvement wherein:

respective centrifugal force counter-weights are reciprocal in radially extending guides in said chuck body, with said at least one chamber being in communication with at least one of said guides; and for each of said clamping jaws, a respective lever is provided that is supported in said chuck body and connects one of said clamping jaws with one of said centrifugal force counter-weights such that during actuation of said clamping jaws, and hence displacement of said centrifugal force counter-weights, a pump movement is produced and said lubricating grease is pressed from said at lease one chamber into said lubricating bores and to said guide surfaces.

* * * * *